United States Patent Office 3,488,585
Patented Jan. 6, 1970

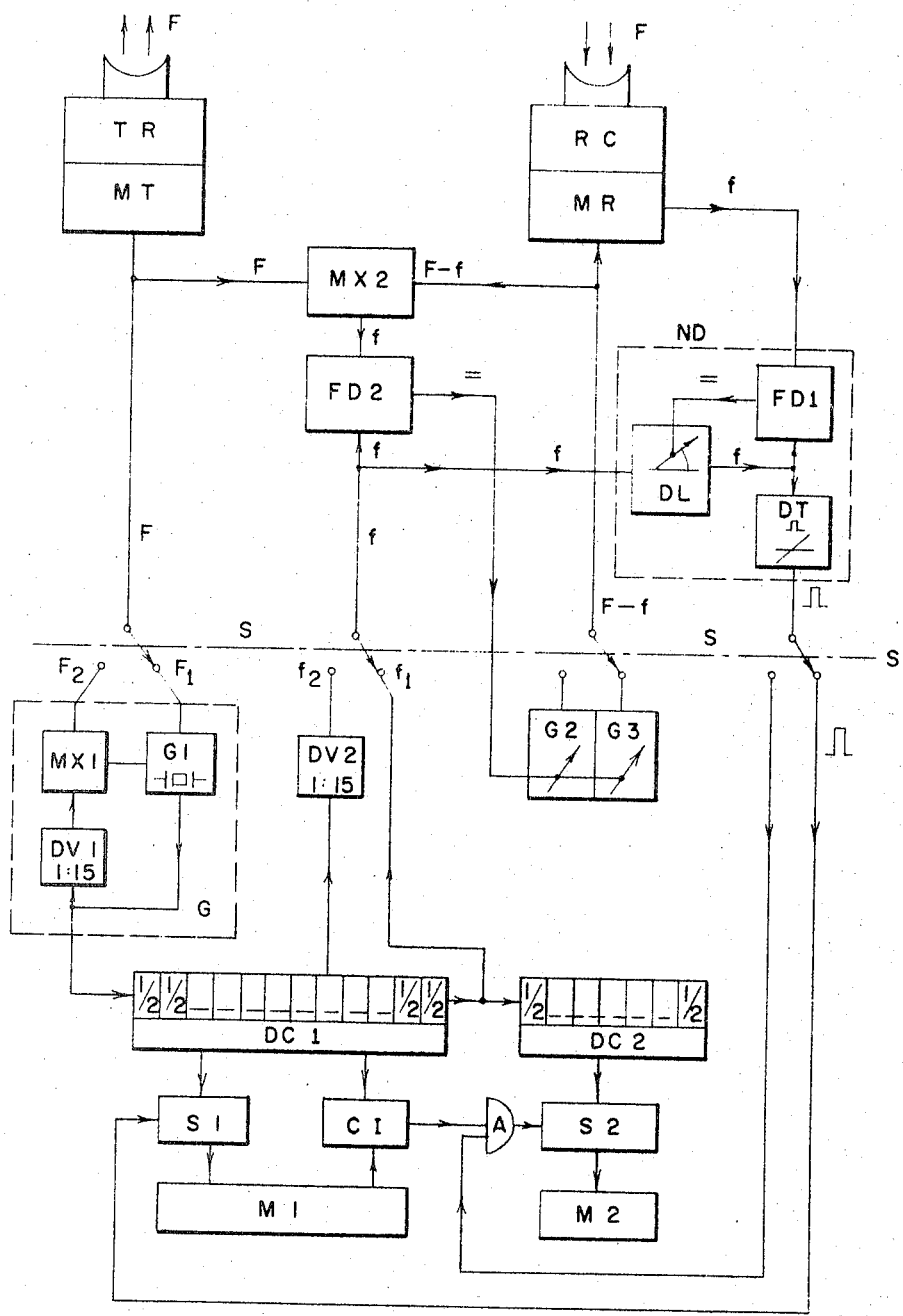

3,488,585
DIGITAL DELAY MEASURING INSTRUMENT EMPLOYING VERNIER PRINCIPLE
Carl-Erik Granqvist, Lidingo, Sweden, assignor to AGA Aktiebolag, Lidingo, Sweden, a corporation of Sweden
Filed Feb. 23, 1967, Ser. No. 618,120
Claims priority, application Sweden, Apr. 28, 1966, 5,815/66
Int. Cl. G01r 11/06
U.S. Cl. 324—68                        5 Claims

ABSTRACT OF THE DISCLOSURE

The instrument produces a sinusoidal signal at a first or a second frequency and counting pulses of a fixed frequency which is a multiple ($2^{12}$) of the first frequency. First, the instrument transmits the first frequency and a counter starts counting the pulses and is stopped by a marker signal representing the delay. The counted value is stored in a storage means. The instrument then transmits at the second frequency, the pulses being again counted by the counter. A coincidence circuit responds when the counter attains the value stored in the storage means to produce a coincidence pulse. An additional counter counts the complete periods ($2^{12}$) of the first counter and is connected to an indicator when a coincidence pulse coincides with a marker signal. The time (count of the additional counter) required for such coincidence, according to the Vernier principle, indicates the number of complete wavelengths at the first frequency comprised by the signal path.

---

The invention relates to the measurement of a delay of a signal path, for instance to distance measuring by means of a radiated wave, of the type where the phase of the signal supplied to the path is compared with that of the output signal from the path. The phase difference is a measure of the delay, the correct value of which may be $\alpha T/2\pi$, where $\alpha$ is the phase difference and $T$ the period of the signal. The result, however, is ambiguous, in that it may be necessary to add a multiple of $T$ in order to obtain the correct value.

It is known to resolve this ambiguity by switching the instrument to a different frequency. This is equivalent to changing $\alpha$ and $T$ to new values $\alpha'$ and $T'$ and seeking integers $n$ and $n'$ to satisfy the equation $$\alpha T 2\pi + nT = \alpha' T'/2\pi + n'T'$$

It is known from U.S. patent specification 2,877,416 to measure a phase difference at a certain frequency by producing pulses at a multiple of the frequency and counting the number of pulses, the beginning and the end of the count being determined by the undelayed and the delayed signal, respectively.

The instrument of the present invention makes use of this known principle for producing a digital display of the phase value and provides additional equipment for determining the number of periods to be added according to the Vernier principle. According to this principle, if the instrument is made to operate at a different frequency the delay is represented by a different number of pulses, and this number has to be added repeatedly a certain number of times to make it coincide with the number obtained by counting during the foregoing measurement at the first frequency. To make this possible, a storage means is provided for storing the result of the first count. An additional counter counts the complete periods of the principal counter and an indicator is provided for displaying the number of complete periods of the principal counter that is required before coincidence is reached between the delayed marker signal and a coincidence pulse generated when the principal counter attains the value stored in the storage means.

An embodiment of the invention is shown on the drawing.

The instrument shown is a distance measuring instrument having a transmitter TR for transmitting a wave along a signal path and a receiver RC for receiving the translated wave, for instance after reflection at the far end of the distance to be measured. The transmitter emits a beam of light and comprises a modulating unit MT to which is applied a measuring signal of frequency F, so that the transmitted light beam is modulated at the frequency F.

A selector S is provided for adjusting the frequency of the measuring signal to have either a first or a second value, these being designated by subscripts 1 and 2, respectively. A generator G is provided with two output terminals, from which the frequencies $F_1$ and $F_2$ can be taken off, depending on the position of the selector S. The generator G includes a reference oscillator G1, such as a crystal oscillator with a high degree of precision, which supplies a pulse sequence of fixed frequency to the $F_1$ terminal. The second value $F_2$ is obtained from a frequency divided DV1 having a ratio of 1:15, to which the pulse sequence is supplied. The divided output is mixed in a mixer MX1 with the pulse sequence and the mixer produces the sum frequency, so that $F_2 = 16F_1/15$. The reference oscillator G1 is connected to the first stage of a counter DC1 shown as consisting of a tandem arragement of twelve frequency dividing stages for division by 2, so that the frequency $f_1 = F_1 \cdot 2^{-12} f_1$ is the first valve of the frequency $f$ of a secondary measuring signal, whose frequency, in the other position of selector S, has the second values $f_2 = 16f_1:15$; $f_2$ is obtained from an earlier stage of conuter DC1 via a frequency divider DV2, the output of which is connected to a contact of selector S.

Coupled to the output of DC1 is also an additional counter DC2, which likewise comprises a plurality of 1:2 dividing stages in tandem arrangement, so that counter DC2 will count the number of complete periods at frequency $f_1$ delivered from counter DC1.

Both of the counters are shown as a plurality of dividing stages forming a well known type of binary counter. For instance, each stage may be a bistable multivibrator circuit which changes from one operating state to the other in response to each positive-going flank of the pulses from the foregoing stage, thus halving the pulse rate applied to it. Well-known wave-shaping and phase-adjusting circuits may be inserted where desirable to transform a rectangular wave to a sinusoidal wave or vice versa. These units have not been shown, since they are well known in the art and do not contribute to the understanding of the circuit.

The embodiment shown belongs to the known type of distance measuring instrument, in which the translated signal is of a high frequency F, whereas a heterodyning is performed to transpose this frequency down to a much lower value $f$ within the instrument. This heterodyning takes place on the high frequency F before as well as after the translation thereof over the signal path and changes the phase of both signals in the same manner. The phase difference caused by translation is therefore present also between the two lower-frequency signals, which may be said to be secondary measuring signals, whereas the signal of frequency F transmitted from TR is the primary measuring signal.

The accuracy of the measurement is dependent on that of the measuring frequency, and the same thing is true about the counting of the pulse sequence, whose frequency must therefore also be highly accurate to render an exact phase value. As shown, the reference oscillator G1 is of the crystal type. One such oscillator is enough owing to the fact that the low frequency $f_1$ is derived by counting down the high frequency $F_1$ in counter DC1. Since the second values of both frequencies are also derived by frequency division in DV1 and DV2, these frequencies are also arithmetically related to the basic frequency $F_1$. The difference frequency required for the heterodyning process is derived from an auxiliary oscillator comprising corresponding sections G2 and G3 for the second and the first value, respectively, of the difference frequency $F-f$. The difference frequency is applied to a mixer MX2 and to the modulating unit MR of the receiver.

The measuring signal of frequency F which is applied to the modulating unit MT is also applied to mixer MX2, in which it heterodynes with $F-f$ to form the difference between these frequencies i.e. $f$. Oscillator G2, 3 need not be of high accuracy. Instead it is phase-controlled by a phase detector FD2 which compares the frequency $f$ from MX2 with that from DC1. The measuring signal $f$ therefore accurately represents the reference or undelayed phase and is applied to a detector ND, in which a comparison takes place with the signal representing the delayed phase and also having the lower frequency value $f$. This signal is obtained in the modulating unit MR, in which $F-f$ heterodynes with F received by the receiver RC to form an output signal of frequency $f$, which is also applied to ND.

Detector ND comprises a phase detector FD1 to which the output signal from MR is applied. Also applied to another input of FD1 is that output of a delay means DL to which the undelayed measuring signal $f$ is applied, and in which a delay by the same phase angle as that of the signal path is produced. The output signal from DL is fed to the second input of FD1 and the phase detector output controls the delay of DL so that the two detector inputs have equal phase. Owing to the fact that DL is a controlled circuit, this delay means does not have to be calibrated or to be of high accuracy. The delayed signal is applied to a null detector DT to produce a marker signal or pulse corresponding to the positive-going zero passage of the signal applied. The marker signal reaches one of a pair of terminals, depending on the position of selector S as will be described in the following.

Associated with counter DC1 is a storage means, which is coupled to the counter via a switch S1. The switch is controlled by the marker signal in the first position of selector S and responds to the marker signal to close the connection and make storage means M1 store the number attained by counter DC1 at that instant.

Also connected to counter DC1 is a coincidence circuit CI for producing a coincidence pulse when the counter reaches the number stored in storage means M1. The coincidence pulse then produced is fed to one input of an AND circuit A, the other input of which is connected to the output of null detector DT to receive the marker signal in the second position of selector S.

An indicator M2, which may also be a storage means of the same type as M1, is connected via a coupling means S2 to counter DC2 when coupling means S2 is actuated by the output from AND circuit A.

SUMMARY OF OPERATION

Counter DC1 receives fixed-frequency pulses at frequency $F_1 = f_1 \cdot 2^{12}$. When selector S is in the first position, upon arrival of the delayed marker pulse from DT to S1, the counter value is transferred to storage means M1 and represents a coarse count of the fraction of the total period of the counter DC1 operation corresponding to the delay of the signal path.

With selector S in the second position, both F and $f$ have values that are 16/15 of their former values and the counter DC1 will register a different number at the moments when a marker signal arrives, since the delay is now represented by a different phase value at the higher measuring frequency. According to the well known Vernier principle, counter DC1 has to go through a number of complete periods until the same value coincides with the arrival of a marker signal. These complete periods are counted by counter DC2. To find the moments at which there is coincidence between the desired value in counter DC1 and a marker pulse, coincidence circuit CI gives off a pulse each time DC1 passes the value that was stored in M1 when selector S was in its first position. However, only when this value in DC1 coincides with a marker signal is the value registered in DC2 to be passed on to indicator M2 and be displayed. This operation is controlled by AND circuit A, which receives the coincidence pulse from CI as well as the marker signal. When these two inputs coincide, coupling means S2 is actuated by A and connects indicator M2 with DC2, and indicator M2 then shows the number of complete periods of counter DC1 that had to be performed until the Vernier coincidence occurred.

What is claimed is:

1. An instrument for digitally measuring the delay of a signal path comprising: a generator for producing and applying a measuring signal to a signal path at either one of a first frequency or a second frequency, and for producing a sequence of fixed-frequency pulses having a fixed phase relative to said measuring signal, said generator including a counter for receiving said pulse sequence; a detector for receiving a delayed output signal from said signal path and, responsive thereto, for generating a marker signal; a storage means connected to the counter; and a switch interposed in the connection between said counter and said storage means and responsive to said marker signal to complete said connection to cause the value of the counter to be stored in said storage means; wherein the improvement comprises a coincidence circuit, connected to said counter and to said storage means, for producing a coincidence pulse when the counter reaches a count corresponding to the stored value in said storage means; an AND circuit having a first input for receiving said coincidence pulse and having a second input; a selector for, in the actuated position thereof, adjusting the generator to said second frequency and for connecting said second input of said AND circuit to said detector; an additional counter connected to said generator for counting the number of said pulse sequences; an indicator; and a coupling means connected between the indicator and the additional counter for causing, responsive to said AND circuit, the count of said additional counter to be transferred to said indicator.

2. An instrument as defined in claim 1, wherein said generator comprises a reference oscillator connected to said counter for generating a pulse sequence.

3. An instrument as defined in claim 2, in which the output of said counter is applied to said signal path as a measuring signal.

4. An instrument as defined in claim 3, wherein the generator supplies a primary measuring signal to the signal path and supplies a frequency-transposed secondary measuring signal to said detector.

5. An instrument as defined in claim 4, wherein the generator supplies the pulses of the pulse sequence as said first frequency of the primary measuring signal and the output of said counter as the first frequency of the secondary measuring signal.

References Cited

UNITED STATES PATENTS 2,665,411   1/1954   Frady.
3,133,189   5/1964   Bagley et al.
3,366,886   1/1968   Gilkison.

RUDOLPH V. ROLINEC, Primary Examiner

P. F. WILLE, Assistant Examiner

U.S. Cl. X.R.

235—92